US012713441B2

(12) United States Patent
Liu et al.

(10) Patent No.: US 12,713,441 B2
(45) Date of Patent: Aug. 18, 2026

(54) BEAM DETERMINATION FOR MULTIPLE PDSCH TRANSMISSIONS OR PUSCH TRANSMISSIONS SCHEDULED BY ONE DCI

(71) Applicant: Lenovo (Beijing) Limited, Beijing (CN)

(72) Inventors: Bingchao Liu, Beijing (CN); Chenxi Zhu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 373 days.

(21) Appl. No.: 18/294,776

(22) PCT Filed: Aug. 5, 2021

(86) PCT No.: PCT/CN2021/110719

§ 371 (c)(1),
(2) Date: Feb. 2, 2024

(87) PCT Pub. No.: WO2023/010377

PCT Pub. Date: Feb. 9, 2023

(65) Prior Publication Data

US 2025/0089066 A1 Mar. 13, 2025

(51) Int. Cl.

| | |
|---|---|
| ***H04L 5/00*** | (2006.01) |
| ***H04B 7/06*** | (2006.01) |
| ***H04L 1/1812*** | (2023.01) |
| ***H04W 72/232*** | (2023.01) |

(52) U.S. Cl.

CPC ...... *H04W 72/232* (2023.01); *H04B 7/06952* (2023.05); *H04L 1/1812* (2013.01); *H04L 5/0055* (2013.01)

(58) Field of Classification Search

None

See application file for complete search history.

(56) References Cited

U.S. PATENT DOCUMENTS

| | | | | |
|---|---|---|---|---|
| 2022/0132545 A1* | 4/2022 | Lee | ........................ | H04L 1/1896 |
| 2023/0337233 A1* | 10/2023 | Zhou | ..................... | H04L 5/0055 |

FOREIGN PATENT DOCUMENTS

| | | |
|---|---|---|
| WO | 2020261174 A1 | 12/2020 |
| WO | 2021006766 A2 | 1/2021 |

OTHER PUBLICATIONS

Lenovo , et al., "Discussion of multi-TRP/panel transmission", 3GPP TSG RAN WG1 Meeting #98bis, R1-1910142, Chongqing, China, Oct. 14, 2019, 14 pages.

(Continued)

*Primary Examiner* — Abdelilah Elmejjarmi

(74) *Attorney, Agent, or Firm* — FIG. 1 Patents

(57) ABSTRACT

Methods and apparatuses for beam determination for multiple PDSCH transmissions or PUSCH transmissions scheduled by one DCI are disclosed. A method comprises receiving a first DCI, wherein the first DCI schedules multiple PDSCH transmissions each of which carries one or multiple TBs, each TB carried in each PDSCH transmission is different, and the first DCI indicates a TCI or UL TCI state update; and determining application time of the TCI or UL TCI state update indicated by the first DCI based on at least one PUCCH resource carrying HARQ-ACK information for at least one of the TBs carried in all PDSCH transmissions scheduled by the first DCI.

20 Claims, 3 Drawing Sheets

(56) References Cited

OTHER PUBLICATIONS

OPPO , "Enhancements on Multi-Beam Operation", 3GPP TSG RAN WG1 #105-e, R1-2104732, e-Meeting, May 10, 2021, 18 pages.
PCT/CN2021/110719 , "International Preliminary Report on Patentability", International Application No. PCT/CN2021/110719, Feb. 6, 2024, 4 pages.
PCT/CN2021/110719 , "International Search Report and Written Opinion", International Application No. PCT/CN2021/110719, Apr. 25, 2025, 6 pages.
Xiaomi , "Enhancements on Multi-TRP/Panel Transmission", 3GPP TSG RAN WG1 #97, R1-1907442, Reno, USA, May 13, 2019, 4 pages.

* cited by examiner

BEAM DETERMINATION FOR MULTIPLE PDSCH TRANSMISSIONS OR PUSCH TRANSMISSIONS SCHEDULED BY ONE DCI

FIELD

The subject matter disclosed herein generally relates to wireless communications, and more particularly relates to methods and apparatuses for beam determination for multiple PDSCH transmissions or PUSCH transmissions scheduled by one DCI.

BACKGROUND

The following abbreviations are herewith defined, at least some of which are referred to within the following description: New Radio (NR). Very Large Scale Integration (VLSI). Random Access Memory (RAM). Read-Only Memory (ROM). Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Downlink control information (DCI), Physical Downlink Control Channel (PDCCH), Physical Downlink Shared Channel (PDSCH), Physical Uplink Control Channel (PUCCH), Physical Uplink Shared Channel (PUSCH), transmission configuration indication or transmission configuration indicator (TCI), sounding reference signal (SRS). Media Access Control (MAC), control element (CE), Frequency range 2 (FR2): corresponding to 24.25 GHz~52.6 GHz, subcarrier spacing (SCS), Hybrid Automatic Repeat Request (HARQ), Acknowledge (ACK), Negative Acknowledge (NACK), downlink control information (DCI), Quasi-Colocation (QCL).

To support wideband operation in high frequency band above 52.6 GHz. OFDM waveform with larger SCSs (e.g., 480 kHz and/or 960 kHz) is adopted for DL transmission. It has been agreed that one DCI (or a single DCI) can schedule multiple PDSCH transmissions or multiple PUSCH transmissions with different TBs, where each PDSCH transmission or each PUSCH transmission is transmitted in one slot and carries one or multiple (e.g. two) TBs, and each TB carried in each PDSCH transmission or each PUSCH transmission is different.

In NR Release 17, the TCI state (or DL TCI state) for reception of a set of dedicated PDCCH transmissions or all PDSCH transmissions and the UL TCI state for transmission of a set of dedicated PUCCH transmissions or all PUSCH transmissions in a cell can be directly indicated or updated by a DCI. When the DCI is a DCI that schedules multiple PDSCH transmissions or multiple PUSCH transmissions with different TBs, it is yet unclear how the application time of the indicated TCI state or indicated UL TCI state is determined.

In addition, when the application time of an indicated TCI state or indicated UL TCI state is determined as being from a slot before which some of the scheduled PDSCH transmission(s) or PUSCH transmission(s) have been transmitted, whether the indicated TCI state or indicated UL TCI state can apply to the remaining scheduled PDSCH transmission(s) or PUSCH transmission(s) have not yet been transmitted.

This invention targets the above issues.

BRIEF SUMMARY

Methods and apparatuses for beam determination for multiple PDSCH transmissions or PUSCH transmissions scheduled by one DCI are disclosed.

In one embodiment, a method comprises receiving a first DCI, wherein the first DCI schedules multiple PDSCH transmissions each of which carries one or multiple TBs, each TB carried in each PDSCH transmission is different, and the first DCI indicates a TCI or UL TCI state update; and determining application time of the TCI or UL TCI state update indicated by the first DCI based on at least one PUCCH resource carrying HARQ-ACK information for at least one of the TBs carried in all PDSCH transmissions scheduled by the first DCI.

In one embodiment, one ACK for any TB indicates an ACK for the first DCI. On the other hand, NACKs for all TBs of all PDSCH transmissions scheduled by the first DCI indicate a NACK for the first DCI. The application time of the TCI or UL TCI state update indicated by the first DCI may be determined based on a PUCCH resource carrying HARQ-ACK information including HARQ-ACK information for the last PDSCH transmission scheduled by the first DCI and an ACK for any TB of the scheduled PDSCH transmissions. Alternatively, the application time of the TCI or UL TCI state update indicated by the first DCI may be determined based on a first PUCCH resource carrying an ACK for any TB of any PDSCH transmission scheduled by the first DCI.

In another embodiment, the method may further comprise receiving a second DCI that schedules multiple PDSCH transmissions or PUSCH transmissions in continuous slots each of which carries one or multiple TBs, each TB for each PDSCH transmission or PUSCH transmission scheduled by the second DCI is different; and determining when the TCI or UL TCI state update indicated by the first DCI is applied according to a capability that indicates whether DL or UL beam switching within a CP for the SCS of the cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and the same as or earlier than a last slot for reception of PDSCH transmissions or transmission of PUSCH transmissions scheduled by the second DCI.

In some embodiment, if the capability indicates that DL or UL beam switching within a CP for the SCS of the cell for reception of the PDSCH transmissions or transmission of PUSCH transmissions in continuous slots scheduled by the second DCI is supported, applying the TCI or UL TCI state update indicated by the first DCI to each of reception of the PDSCH transmission(s) or transmission of PUSCH transmission(s) scheduled by the second DCI that is later than the first slot that is after the application time of the TCI or UL TCI state update indicated by the first DCI. If the capability indicates that DL or UL beam switching within a CP for the SCS of the cell for the PDSCH transmissions or PUSCH transmissions in continuous slots scheduled by the second DCI is not supported, the TCI or UL TCI state update indicated by the first DCI is not applied to any PDSCH transmission or PUSCH transmission scheduled by the second DCI, and the TCI or UL TCI state that has applied to reception of a first PDSCH transmission or transmission of a first PUSCH transmission scheduled by the second DCI is applied to reception of all PDSCH transmissions or transmission of all PUSCH transmissions in continuous slot scheduled by the second DCI.

In some embodiment, the capability may be transmitted to a base unit (e.g. gNB). Alternatively, the capability may be determined implicitly.

In one embodiment, a method comprises transmitting a first DCI, wherein the first DCI schedules multiple PDSCH transmissions each of which carries one or multiple TBs, each TB carried in each PDSCH transmission is different, and the first DCI indicates a TCI or UL TCI state update; and determining application time of the TCI or UL TCI state update indicated by the first DCI based on at least one PUCCH resource carrying HARQ-ACK information for at least one of the TBs carried in all PDSCH transmissions scheduled by the first DCI.

In another embodiment, a remote unit (UE) comprises a receiver that receives a first DCI, wherein the first DCI schedules multiple PDSCH transmissions each of which carries one or multiple TBs, each TB carried in each PDSCH transmission is different, and the first DCI indicates a TCI or UL TCI state update; and a processor that determines application time of the TCI or UL TCI state update indicated by the first DCI based on at least one PUCCH resource carrying HARQ-ACK information for at least one of the TBs carried in all PDSCH transmissions scheduled by the first DCI.

In yet another embodiment, a base unit comprises a transmitter that transmits a first DCI, wherein the first DCI schedules multiple PDSCH transmissions each of which carries one or multiple TBs, each TB carried in each PDSCH transmission is different, and the first DCI indicates a TCI or UL TCI state update; and a processor that determines application time of the TCI or UL TCI state update indicated by the first DCI based on at least one PUCCH resource carrying HARQ-ACK information for at least one of the TBs carried in all PDSCH transmissions scheduled by the first DCI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
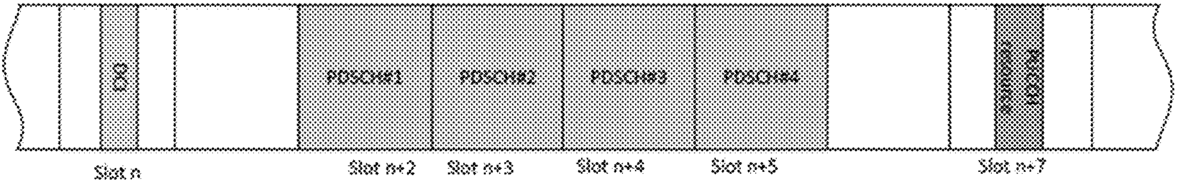
FIG. 1 illustrates an example of a second sub-embodiment of a first embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In NR Release 17, DCI based unified TCI framework is supported. When joint DL/UL TCI (which means DL RX spatial filter and UL TX spatial filter are determined by a same indicated TCI state) is configured, the DL RX spatial filter for a set of dedicated PDCCH receptions (a dedicated PDCCH reception is the PDCCH reception in RRC-connected mode) and all PDSCH receptions and the UL TX spatial filter for a set of dedicated PUCCH transmissions (a dedicated PUCCH transmission is the PUCCH transmission in RRC-connected mode) and all PUSCH transmissions are both determined by the QCL-TypeD RS contained in the joint DL/UL TCI state indicated by a transmission configuration indicator (TCI) field contained in a DCI or in a MAC CE (the MAC CE only activates one TCI state configured by RRC signaling). When separate DL/UL TCI (which means DL TCI state and UL TCI state are updated or activated separately) is configured, the DL RX spatial filter for a set of dedicated PDCCH receptions and all PDSCH receptions is determined by the QCL-TypeD RS contained in the DL TCI state indicated by a transmission configuration indicator (TCI) field in a DCI or a MAC CE, while the UL TX spatial filter for a set of dedicated PUCCH transmissions and all PUSCH transmissions is directly indicated by the UL TCI state indicated by a UL TCI field in a DCI or a MAC CE.

A first embodiment relates to determining the HARQ-ACK information (i.e. ACK or NACK) for a DCI that carries TCI state indication (i.e. beam indication) when the DCI schedules multiple PDSCH transmissions with different TBs.

According to a first sub-embodiment of the first embodiment, the DCI (e.g. DCI with format 1_1 or 1_2 for DL scheduling) carrying beam indication is restricted to only schedule a single PDSCH transmission, where the single PDSCH transmission carries one or two TBs transmitted in one slot. In case of two TBs, each of the two TBs is different (i.e. with different TBs). Whether one TB is successfully transmitted (i.e. successfully received by the UE) is indicated by an HARQ-ACK bit (i.e. ACK or NACK) for the one TB. An ACK for one TB means that the one TB is successfully transmitted (i.e. successfully received by the UE). A NACK for one TB means that the one TB is not successfully transmitted (i.e. not successfully received by the UE).

Whether a DCI indicating a TCI state update (may also be referred to as TCI state indication) that schedules a single PDSCH transmission is successfully transmitted (i.e. successfully received by the UE) is determined according to the HARQ-ACK information (i.e. HARQ-ACK bits) for the TBs carried in the PDSCH transmission scheduled by the DCI. In particular, if a single PDSCH transmission carrying one TB is scheduled by a DCI with format 1_1 or 1_2, the ACK or NACK for the one TB is used as the ACK or NACK for the DCI with format 1_1 or 1_2. If a single PDSCH transmission carrying two TBs is scheduled by a DCI with format 1_1 or 1_2, the ACK for any of the two TBs can be used as the ACK for the DCI with format 1_1 or 1_2; while NACKs for both TBs mean the NACK for the DCI with format 1_1 or 1_2.

According to a second sub-embodiment of the first embodiment, it is assumed that the DCI with format 1_1 or 1_2 carrying beam indication can schedule multiple PDSCH transmissions with different TBs. Each scheduled PDSCH transmission carries one or two TBs transmitted in one slot. Each TB of each scheduled PDSCH transmission is different. For a DCI with format 1_1 or 1_2 scheduling multiple PDSCH transmissions each of which carries one or two TBs, one ACK for any one of the scheduled TBs (i.e. any TB of the scheduled PDSCH transmissions) indicates an ACK for the DCI with format 1_1 or 1_2. If there is no ACK for all scheduled TBs (i.e. all TBs of all scheduled PDSCH transmissions) (i.e. if there are all NACKs for all scheduled TBs), a NACK is indicated for the DCI with format 1_1 or 1_2. Incidentally, if one scheduled PDSCH transmission carries one TB, the ACK or NACK for the one TB can be referred to as the ACK or NACK for the one scheduled PDSCH transmission.

FIG. 1 illustrates an example of the second sub-embodiment of the first embodiment. In FIG. 1, a DCI (e.g. DCI with format 1_1 or 1_2) schedules four PDSCH transmissions (e.g. PDSCH #1. PDSCH #2. PDSCH #3 and PDSCH #4) each of which carries a single TB (i.e. one TB) transmitted in one slot. The DCI is transmitted in slot n, while the scheduled PDSCH #1. PDSCH #2. PDSCH #3 and PDSCH #4 are transmitted in slot n+2, slot n+3, slot n+4 and slot n+5, respectively. The UE shall report the HARQ-ACK information for the scheduled four PDSCH transmissions (i.e. four TBs transmitted in slot n+2, slot n+3, slot n+4 and slot n+5) in slot n+7 using a PUCCH resource. If the UE indicates at least one ACK for any of the scheduled four PDSCH transmissions (PDSCH #1. PDSCH #2. PDSCH #3 and PDSCH #4), the gNB assumes that an ACK for the DCI is indicated. On the other hand, if the UE indicates NACKs for all of the scheduled four PDSCH transmissions (PDSCH #1. PDSCH #2. PDSCH #3 and PDSCH #4), the gNB assumes that a NACK for the DCI is indicated.

A second embodiment relates to determining application time of the TCI state indicated by a DCI scheduling multiple PDSCH transmissions.

As shown in FIG. 1, if a single PUCCH resource carrying HARQ-ACK information (i.e. HARQ-ACK bits) for all of TBs (i.e. all of TBs of all of PDSCH transmissions) scheduled by a DCI is transmitted, the new TCI state indicated by the DCI is applied from a first slot that is after some threshold time (referred to as "application time") (e.g. after a prescribed number of symbols or after a prescribed millisecond) starting from the end of the PUCCH resource carrying the HARQ-ACK information (if ACK is indicated for the DCI), according to a first sub-embodiment of the second embodiment. The first slot that is after the application time is referred to as "effective slot".

On the other hand, two or more PUCCH resources to carry the HARQ-ACK information bits can be supported. For example, different PUCCH resources can be used where some PUCCH resource(s) carrying the HARQ-ACK information (i.e. HARQ-ACK bit(s)) can be transmitted in the middle of non-contiguous PDSCH transmissions to allow earlier transmission of HARQ-ACK information for earlier scheduled TB(s) (i.e. TB(s) of earlier scheduled PDSCH transmission(s)). Therefore, the PUCCH resource on which the application time (or effective slot) of the new indicated TCI state is determined is to be determined.

Figure 2:
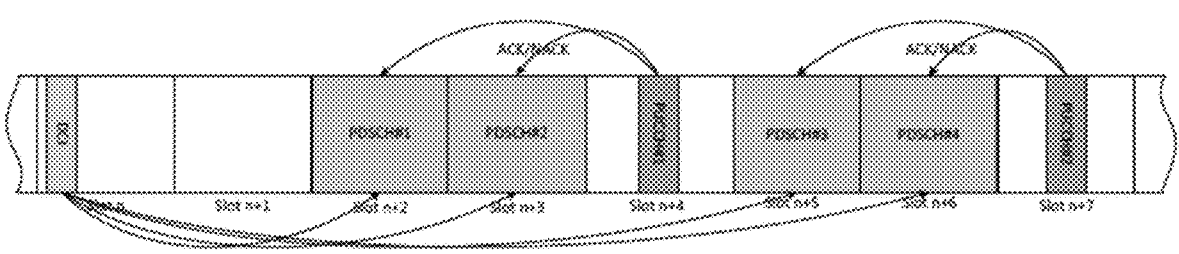
FIG. 2 illustrates an example of multi-PDSCH scheduling with separate HARQ-ACK information bits carried by separate PUCCH resources.

FIG. 2 illustrates an example of multi-PDSCH scheduling with separate HARQ-ACK feedbacks by separate PUCCH resources. In FIG. 2, a DCI (e.g. DCI with format 1_1 or 1_2) schedules four PDSCH transmissions (e.g. PDSCH #1. PDSCH #2, PDSCH #3 and PDSCH #4) each of which carries a single TB (i.e. one TB) transmitted in one slot. The DCI is transmitted in slot n, while the scheduled PDSCH #1. PDSCH #2. PDSCH #3 and PDSCH #4 are transmitted in slot n+2, slot n+3, slot n+5 and slot n+6, respectively. The HARQ-ACK information for PDSCH #1 and PDSCH #2 are reported by a PUCCH resource transmitted in slot n+4 (PUCCH #1), and the HARQ-ACK information for PDSCH #3 and PDSCH #4 are reported by another PUCCH resource transmitted in slot n+7 (PUCCH #2).

According to a second sub-embodiment of the second embodiment, when separate PUCCH resources carrying separate HARQ-ACK information corresponding to different PDSCH transmissions are reported, the PUCCH resource carrying HARQ-ACK information including HARQ-ACK information for the last PDSCH transmission scheduled by the DCI and an ACK for any TB is selected to determine the application time for the new TCI indication. In particular, from the first slot (i.e. effective slot) that is after a prescribed number of symbols or after a prescribed millisecond from the end of the selected PUCCH resource, the new TCI indication would be applied.

According to a third sub-embodiment of the second embodiment, when separate PUCCH resources carrying separate HARQ-ACK information are reported, the PUCCH resource carrying a first ACK for any one of the scheduled TBs (or a first ACK for any TB of any one of the scheduled PDSCH transmissions) is selected to determine the application time for the new TCI indication. In particular, from a first slot (i.e. effective slot) that is after a prescribed number of symbols or after a prescribed millisecond from the end of the selected PUCCH resource, the new TCI indication would be applied.

In the example of FIG. 2, if UE reports {NACK, ACK} in PUCCH #1 (i.e. NACK for PDSCH #1, and ACK for PDSCH #2) and reports {ACK, NACK} in PUCCH #2 (i.e. ACK for PDSCH #3, and NACK for PDSCH #4), according to the second sub-embodiment of the second embodiment, PUCCH #2 (which includes HARQ-ACK information for the last PDSCH transmission (PDSCH #4) scheduled by the DCI and an ACK for PDSCH #3) is selected to determine the application time for the new TCI indication. On the other hand, according to the third embodiment of the second embodiment. PUCCH #1 (which includes ACK for PDSCH #2) is selected to determine the application time for the new TCI indication.

In the example of FIG. 2, if UE reports {NACK, NACK} in PUCCH #1 (i.e. NACK for PDSCH #1, and NACK for PDSCH #2) and reports {ACK, NACK} in PUCCH #2 (i.e. ACK for PDSCH #3, and NACK for PDSCH #4), according to the second sub-embodiment of the second embodiment, PUCCH #2 is selected to determine the application time for the new TCI indication. On the other hand, according to the third embodiment of the second embodiment, PUCCH #2 is selected to determine the application time for the new TCI indication.

In the example of FIG. 2, if UE reports {NACK, NACK} in PUCCH #1 (i.e. NACK for PDSCH #1, and NACK for PDSCH #2) and reports {NACK, NACK} in PUCCH #2 (i.e. NACK for PDSCH #3, and NACK for PDSCH #4), the gNB assumes a NACK for the DCI scheduling PDSCH #1, PDSCH #2, PDSCH #3 and PDSCH #4, and accordingly, the new indicated TCI state (i.e. new beam) will not be applied.

A third embodiment relates to determining the TCI state for reception of the scheduled multiple dedicated PDCCH transmissions or PDSCH transmissions considering different scheduling offsets.

The new TCI state indicated by a DCI is applied to reception of a set of dedicated PDCCH transmissions and all PDSCH transmissions in a carrier, beginning from the first slot (i.e. effective slot) that is at least X ms or Y symbols after the last symbol of the acknowledgment (ACK) (which is carried by a PUCCH resource) of the joint or separate DL/UL TCI state indication (i.e. beam indication). Incidentally, the DCI indicating the new TCI state may schedule a single PDSCH transmission or multiple PDSCH transmissions. The value of X or Y can be configured for the UE according to UE capability.

Figure 3:
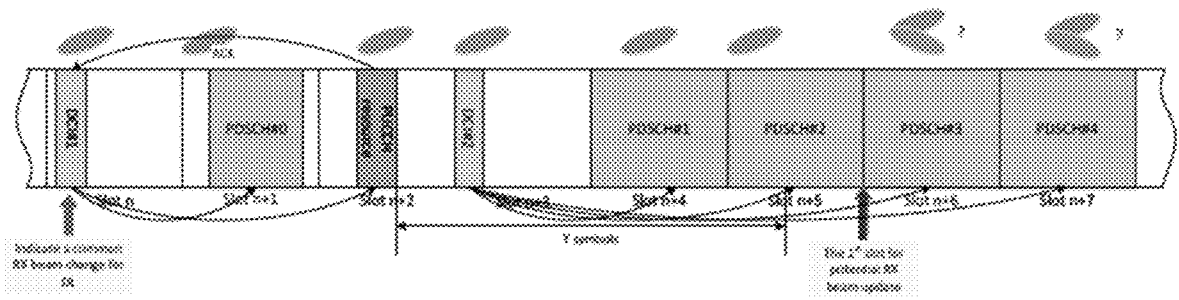
FIG. 3 illustrates an example of a third embodiment.

FIG. 3 illustrates an example of the third embodiment. In FIG. 3, a DCI (DCI #1) transmitted in slot n indicates a new TCI update (e.g. a common RX beam change for DL). The HARQ-ACK information (e.g. ACK) for DCI #1 is reported by PUCCH resource transmitted in slot n+2. Accordingly, the new indicated TCI state should be applicable from the first slot (i.e. effective slot) that is at least X ms or Y symbols after the last symbol of the PUCCH resource transmitted in slot n+2. For example, the new indicated TCI state should be applicable from slot n+6 if an ACK for DCI #1 is reported by the PUCCH resource in slot n+2. In other words, slot n+6 is the effective slot for the new indicated TCI state.

The UE further receives a DCI (DCI #2) in slot n+3 scheduling multiple (e.g. 4) PDSCH transmissions in four continuous slots (e.g. slot n+4, slot n+5, slot n+6 and slot n+7). If the new indicated TCI state is applicable from slot n+6, the UE shall receive PDSCH #2 and PDSCH #3 by using different beams. It means that the UE is required to switch its RX beam during the CP of the first symbol in slot n+6 to a new beam determined by the new indicated TCI state.

The CP lengths of an OFDM symbol with SCS=480 KHz and SCS=960 kHz, in which multi-PDSCH scheduling is supported, are shown in Table 1.

TABLE 1

| | Normal CP | | |
|---|---|---|---|
| SCS | The 1$^{st}$ symbol | The other symbol | Extended CP |
| 480 kHz | 162.5 ns | 146.875 ns | 521.875 ns |
| 960 kHz | 81.25 ns | 73.4375 ns | 260.9375 ns |

Due to short CP lengths, some UE may not have the capability to switch its RX beam during a first symbol of a slot.

In view of the above, according to the third embodiment, a UE capability to indicate whether it can switch its RX beam within a CP for a certain SCS may be introduced.

According to a first sub-embodiment of the third embodiment, the UE explicitly indicates a capability of whether it supports "switch its RX beam within a CP for a certain SCS" to the gNB. If the UE indicates a capability to support "switch its RX beam within a CP for a certain SCS", different TCI states can be applied to receptions of different dedicated PDCCH transmissions or PDSCH transmissions scheduled by a single DCI in continuous slots with the certain SCS. Otherwise (if the UE indicates a capability that does not support "switch its RX beam within a CP for a certain SCS"), the UE shall apply a same TCI state for reception of all scheduled dedicated PDCCH transmissions or PDSCH transmissions in continuous slots, wherein the same TCI state is the TCI state that has applied to reception of the first scheduled dedicated PDCCH transmission or PDSCH transmission (e.g. PDSCH #1 in FIG. 3).

According to a second sub-embodiment of the third embodiment, the UE is not required to indicate the capability of whether it supports "switch its RX beam within a CP for a certain SCS" to the gNB. Rather, it is assumed that the UE supports "switch its RX beam within a CP for a certain SCS". In other words, according to the second sub-embodiment of the third embodiment, the gNB implicitly determines that the UE supports "switch its RX beam within a CP for a certain SCS" unless the UE indicates a capability that does not support "switch its RX beam within a CP for a certain SCS" to the gNB.

According to a third sub-embodiment of the third embodiment, the UE is not required to indicate the capability of whether it supports "switch its RX beam within a CP for a certain SCS" to the gNB. Rather, it is assumed that the UE does not support "switch its RX beam within a CP for a certain SCS". In other words, according to the third sub-embodiment of the third embodiment, the gNB implicitly determines that the UE does not support "switch its RX beam within a CP for a certain SCS" unless the UE indicates a capability to support "switch its RX beam within a CP for a certain SCS" to the gNB.

As a whole, according to any one of the first to the third sub-embodiments of the third embodiment, whether the UE supports "switch its RX beam within a CP for a certain SCS" can be determined explicitly or implicitly. When determining that the UE supports "switch its RX beam within a CP for a certain SCS", from the first slot (i.e. effective slot) that is at least X ms or Y symbols after the last symbol of the PUCCH resource carrying the ACK for a DCI indicating a new TCI update, the new TCI update indicated by the DCI applies to reception of any dedicated PDCCH transmissions and all PDSCH transmissions. When determining that the UE does not support "switch its RX beam within a CP for a certain SCS", when a second DCI schedules multiple dedicated PDCCH transmissions or PDSCH transmissions in continuous slots, if the first slot (i.e. effective slot) that is at least X ms or Y symbols after the last symbol of the PUCCH resource carrying the ACK for a first DCI indicating a new TCI update is later than the first slot for reception of the multiple dedicated PDCCH transmissions or PDSCH transmissions scheduled by the second DCI and is the same as or earlier than the last slot for reception of the multiple dedicated PDCCH transmissions or PDSCH transmissions scheduled by the second DCI, the new TCI update indicated by the first DCI does not apply to reception of any of multiple dedicated PDCCH transmissions or PDSCH transmissions in continuous slot scheduled by the second DCI. Instead, the TCI state that has applied to reception of the first dedicated PDCCH transmission or PDSCH transmission scheduled by the second DCI will apply to reception of all of dedicated PDCCH transmissions or PDSCH transmissions in continuous slot scheduled by the second DCI In the example of FIG. 3, if it is determined that the UE supports RX beam switching within a CP for SCS=480 kHz either by UE explicitly indicating a capability to support RX beam switching within a CP for SCS=480 kHz (according to the first sub-embodiment of the third embodiment) or being determined implicitly (according to the second sub-embodiment of the third embodiment), the new indicated TCI state shall be applied to reception of PDSCH #3 and PDSCH #4. If it is determined that the UE does not support RX beam switching within a CP for SCS=960 KHz either by UE explicitly indicating a capability that does not support RX beam switching within a CP for SCS=960 kHz (according to the first sub-embodiment of the third embodiment) or being determined implicitly (according to the third sub-embodiment of the third embodiment), the new indicated TCI state shall not be applied to reception of PDSCH #3 and PDSCH #4, i.e., the UE shall receive all four PDSCH transmissions (PDSCH #1, PDSCH #2, PDSCH #3 and PDSCH #4) using a same beam determined by the TCI state that has been applied to reception of the first PDSCH transmission (PDSCH #1).

A fourth embodiment relates to determining the TCI state for transmission of the scheduled multiple dedicated PUCCH transmissions or PUSCH transmissions considering different scheduling offsets. The fourth embodiment differs from the third embodiment only in that the first DCI (e.g. DCI #1) indicates a new UL TCI update, while the second DCI (e.g. DCI #2) schedules multiple dedicated PUCCH transmissions or PUSCH transmissions in continuous slot.

Similar to the third embodiment, according to the fourth embodiment, a UE capability to indicate whether it can switch its TX beam within a CP for a certain SCS may be introduced.

According to a first sub-embodiment of the fourth embodiment, the UE indicates a capability of whether it supports "switch its TX beam within a CP for a certain SCS" to the gNB. If the UE indicates a capability to support "switch its TX beam within a CP for a certain SCS", different TCI states can be applied to transmission of different dedicated PUCCH transmissions or PUSCH transmissions in continuous slots with the certain SCS scheduled by a single DCI. Otherwise (if the UE indicates a capability that does not support "switch its TX beam within a CP for a certain SCS"), the UE shall apply a same TCI state for transmission of all scheduled dedicated PUCCH transmissions or PUSCH transmissions in continuous slots, wherein the same TCI state is the TCI state that has applied to transmission of the first scheduled dedicated PUCCH transmission or PUSCH transmission (e.g. PUSCH #1 in FIG. 4).

According to a second sub-embodiment of the fourth embodiment, the UE is not required to indicate the capability of whether it supports "switch its TX beam within a CP for a certain SCS" to the gNB. Rather, it is assumed that the UE supports "switch its TX beam within a CP for a certain SCS". In other words, according to the second sub-embodiment of the fourth embodiment, the gNB implicitly determines that the UE supports "switch its TX beam within a CP for a certain SCS" unless the UE indicates a capability that does not support "switch its TX beam within a CP for a certain SCS" to the gNB.

According to a third sub-embodiment of the fourth embodiment, the UE is not required to indicate the capability of whether it supports "switch its TX beam within a CP for a certain SCS" to the gNB. Rather, it is assumed that the UE does not support "switch its TX beam within a CP for a certain SCS". In other words, according to the third sub-embodiment of the fourth embodiment, the gNB implicitly determines that the UE does not support "switch its TX beam within a CP for a certain SCS" unless the UE indicates a capability to support "switch its TX beam within a CP for a certain SCS" to the gNB.

Figure 4:
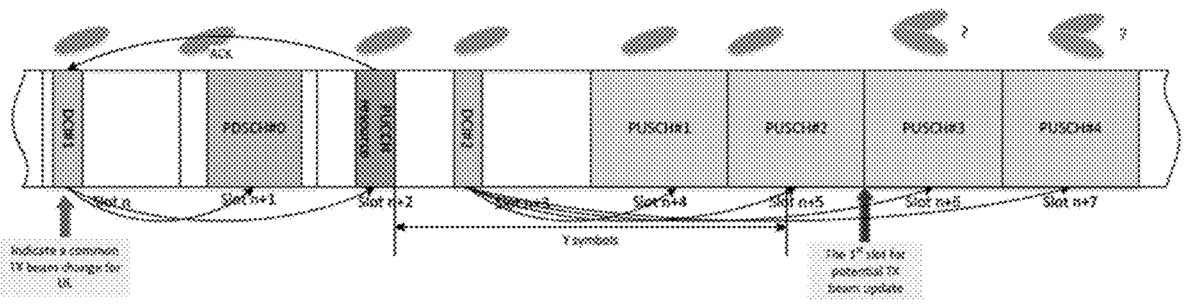
FIG. 4 illustrates an example of a fourth embodiment.

FIG. 4 illustrates an example of determining the UL TCI state for the scheduled multiple dedicated PUCCH transmissions or PUSCH transmissions considering different scheduling offsets, according to the fourth embodiment. If it is determined that the UE supports TX beam switching within a CP for a certain SCS, the new UL TCI state indicated by a DCI is applied to a set of dedicated PUCCH transmissions and all PUSCH transmissions in continuous slots with the certain SCS in the carrier, beginning from the first slot (i.e. effective slot) that is at least X ms or Y symbols after the last symbol of the acknowledgment of the joint or separate DL/UL beam indication. Incidentally, the DCI indicating the new UL TCI state may schedule a single PDSCH transmission or multiple PDSCH transmissions.

In FIG. 4, a DCI (DCI #1) transmitted in slot n indicates a new UL TCI update (e.g. a common TX beam change for UL). The HARQ-ACK information (e.g. ACK) for DCI #1 is reported by a PUCCH resource transmitted in slot n+2. The UE further receives a DCI (DCI #2) in slot n+3 scheduling multiple (e.g. 4) PUSCH transmissions in four continuous slots (e.g. slot n+4, slot n+5, slot n+6 and slot n+7).

Accordingly, if it is determined that the UE supports "switch its TX beam within a CP for a certain SCS", the new indicated UL TCI state is applicable from the first slot (i.e. effective slot) that is at least X ms or Y symbols after the last symbol of the PUCCH resource in slot n+2. In FIG. 4, the effective slot (i.e. the first slot that is Y symbols after the last symbol of the PUCCH resource in slot n+2) is slot n+6 if an ACK for DCI #1 is reported by the PUCCH resource in slot n+2. The UE shall transmit PUSCH #3 as well as PUSCH #4 by using a beam determined by the new indicated UL TCI state.

If it is determined that the UE does not support "switch its TX beam within a CP for a certain SCS", the new indicated UL TCI state will not apply to any of PUSCH #3 or PUSCH #4. Instead, the UE shall apply a same UL TCI state for transmission of all scheduled PUSCH transmissions, wherein the same UL TCI state is the UL TCI state that has been applied to transmission of the first scheduled PUSCH transmission (e.g. PUSCH #1 in FIG. 4).

For example, if it is determined that the UE supports TX beam switching within a CP for SCS=480 kHz (according to the first sub-embodiment of the fourth embodiment) or being determined implicitly (according to the second sub-embodiment of the fourth embodiment), the new indicated UL TCI state shall be applied to transmission of PUSCH #3 and PUSCH #4. If it is determined that the UE does not support TX beam switching within a CP for SCS=960 KHz either by UE explicitly indicating a capability that does not support RX beam switching within a CP for SCS=960 kHz (according to the first sub-embodiment of the fourth embodiment) or being determined implicitly (according to the third sub-embodiment of the fourth embodiment), the new indicated UL TCI state shall not be applied to transmission of PUSCH #3 and PUSCH #4, i.e., the UE shall transmit all four PUSCH transmissions (PUSCH #1, PDSCH #2, PUSCH #3 and PUSCH #4) using a same beam determined by the UL TCI state that has been applied to transmission of the first PUSCH transmission (PUSCH #1).

Figure 5:
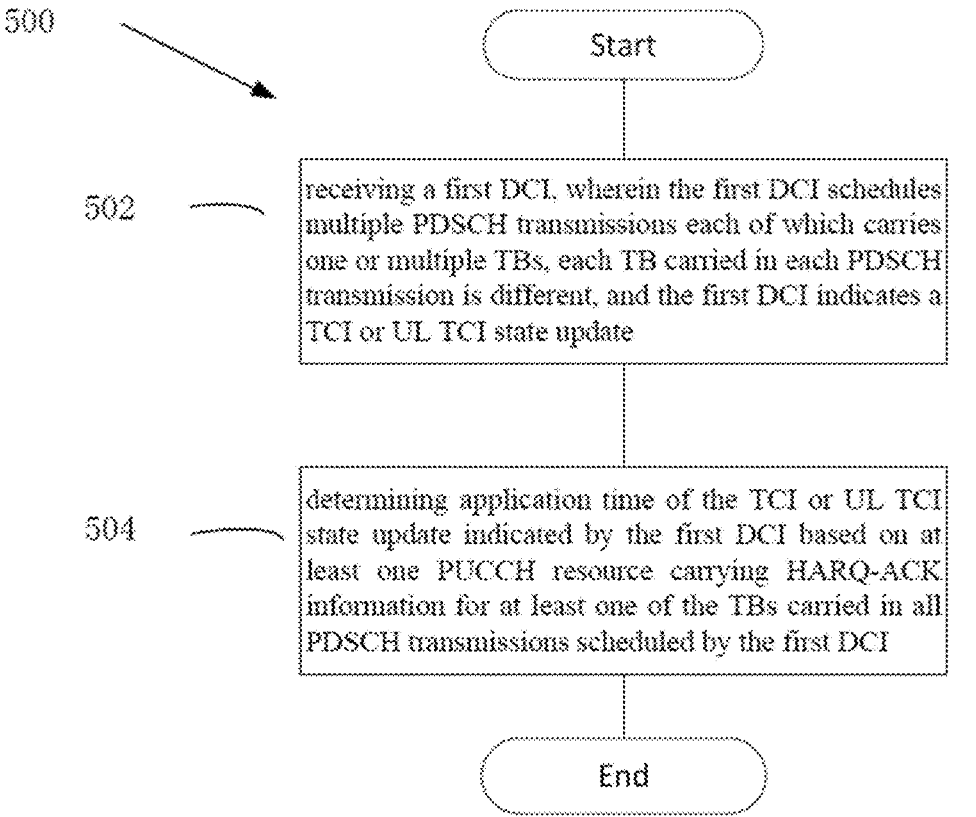
FIG. 5 is a schematic flow chart diagram illustrating an embodiment of a method.

FIG. 5 is a schematic flow chart diagram illustrating an embodiment of a method 500 according to the present application. In some embodiments, the method 500 is performed by an apparatus, such as a remote unit (UE). In certain embodiments, the method 500 may be performed by a processor executing program code, for example, a microcontroller, a microprocessor, a CPU, a GPU, an auxiliary processing unit, a FPGA, or the like.

The method 500 may comprise 502 receiving a first DCI, wherein the first DCI schedules multiple PDSCH transmissions each of which carries one or multiple TBs, each TB carried in each PDSCH transmission is different, and the first DCI indicates a TCI or UL TCI state update; and 504 determining application time of the TCI or UL TCI state update indicated by the first DCI based on at least one PUCCH resource carrying HARQ-ACK information for at least one of the TBs carried in all PDSCH transmissions scheduled by the first DCI.

In one embodiment, one ACK for any TB indicates an ACK for the first DCI. On the other hand. NACKs for all TBs of all PDSCH transmissions scheduled by the first DCI indicate a NACK for the first DCI. The application time of the TCI or UL TCI state update indicated by the first DCI may be determined based on a PUCCH resource carrying HARQ-ACK information including HARQ-ACK information for the last PDSCH transmission scheduled by the first DCI and an ACK for any TB of the scheduled PDSCH transmissions. Alternatively, the application time of the TCI or UL TCI state update indicated by the first DCI may be determined based on a first PUCCH resource carrying an ACK for any TB of any PDSCH transmission scheduled by the first DCI.

The method 500 may further comprise receiving a second DCI that schedules multiple PDSCH transmissions or PUSCH transmissions in continuous slots each of which carries one or multiple TBs, each TB for each PDSCH transmission or PUSCH transmission scheduled by the second DCI is different; and determining when the TCI or UL TCI state update indicated by the first DCI is applied according to a capability that indicates whether DL or UL beam switching within a CP for the SCS of the cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and the same as or earlier than a last slot for reception of PDSCH transmissions or transmission of PUSCH transmissions scheduled by the second DCI.

If the capability indicates that DL or UL beam switching within a CP for the SCS of the cell for reception of the PDSCH transmissions or transmission of PUSCH transmissions in continuous slots scheduled by the second DCI is supported, applying the TCI or UL TCI state update indicated by the first DCI to each of reception of the PDSCH transmission(s) or transmission of PUSCH transmission(s) scheduled by the second DCI that is later than the first slot that is after the application time of the TCI or UL TCI state update indicated by the first DCI. If the capability indicates that DL or UL beam switching within a CP for the SCS of the cell for the PDSCH transmissions or PUSCH transmissions in continuous slots scheduled by the second DCI is not supported, the TCI or UL TCI state update indicated by the first DCI is not applied to any PDSCH transmission or PUSCH transmission scheduled by the second DCI, and the TCI or UL TCI state that has applied to reception of a first PDSCH transmission or transmission of a first PUSCH transmission scheduled by the second DCI is applied to reception of all PDSCH transmissions or transmission of all PUSCH transmissions in continuous slot scheduled by the second DCI. The capability may be transmitted to a base unit (e.g. gNB). Alternatively, the capability may be determined implicitly.

Figure 6:
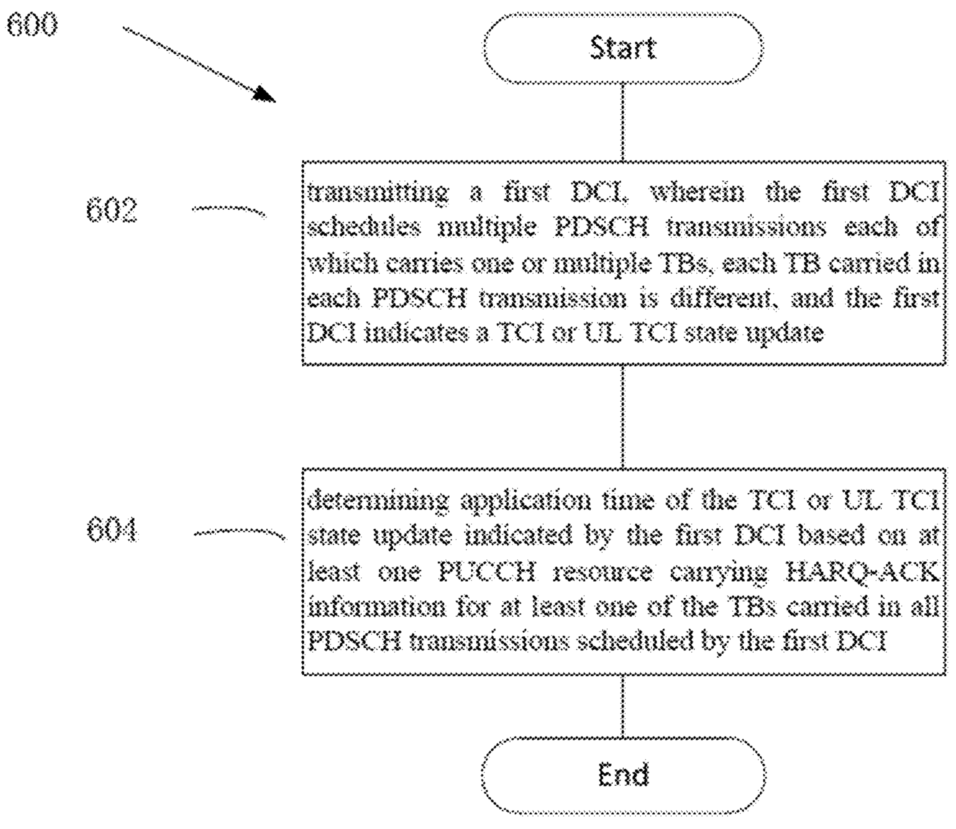
FIG. 6 is a schematic flow chart diagram illustrating a further embodiment of a method.

FIG. 6 is a schematic flow chart diagram illustrating a further embodiment of a method 600 according to the present application. In some embodiments, the method 300 is performed by an apparatus, such as a base unit. In certain embodiments, the method 300 may be performed by a processor executing program code, for example, a microcontroller, a microprocessor, a CPU, a GPU, an auxiliary processing unit, a FPGA, or the like.

The method 600 may comprise 602 transmitting a first DCI, wherein the first DCI schedules multiple PDSCH transmissions each of which carries one or multiple TBs, each TB carried in each PDSCH transmission is different, and the first DCI indicates a TCI or UL TCI state update; and 604 determining application time of the TCI or UL TCI state update indicated by the first DCI based on at least one PUCCH resource carrying HARQ-ACK information for at least one of the TBs carried in all PDSCH transmissions scheduled by the first DCI.

In one embodiment, one ACK for any TB indicates an ACK for the first DCI. On the other hand. NACKs for all TBs of all PDSCH transmissions scheduled by the first DCI indicate a NACK for the first DCI. The application time of the TCI or UL TCI state update indicated by the first DCI may be determined based on a PUCCH resource carrying HARQ-ACK information including HARQ-ACK information for the last PDSCH transmission scheduled by the first DCI and an ACK for any TB of the scheduled PDSCH transmissions. Alternatively, the application time of the TCI or UL TCI state update indicated by the first DCI may be determined based on a first PUCCH resource carrying an ACK for any TB of any PDSCH transmission scheduled by the first DCI.

The method 600 may further comprise transmitting a second DCI that schedules multiple PDSCH transmissions or PUSCH transmissions in continuous slots each of which carries one or multiple TBs, each TB for each PDSCH transmission or PUSCH transmission scheduled by the second DCI is different; and determining when the TCI or UL TCI state update indicated by the first DCI is applied according to a capability that indicates whether DL or UL beam switching within a CP for the SCS of the cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and the same as or earlier than a last slot for reception of PDSCH transmissions or transmission of PUSCH transmissions scheduled by the second DCI.

If the capability indicates that DL or UL beam switching within a CP for the SCS of the cell for reception of the PDSCH transmissions or transmission of PUSCH transmissions in continuous slots scheduled by the second DCI is supported, applying the TCI or UL TCI state update indicated by the first DCI to each of reception of the PDSCH transmission(s) or transmission of PUSCH transmission(s) scheduled by the second DCI that is later than the first slot that is after the application time of the TCI or UL TCI state update indicated by the first DCI. If the capability indicates that DL or UL beam switching within a CP for the SCS of the cell for the PDSCH transmissions or PUSCH transmissions in continuous slots scheduled by the second DCI is not supported, the TCI or UL TCI state update indicated by the first DCI is not applied to any PDSCH transmission or PUSCH transmission scheduled by the second DCI, and the TCI or UL TCI state that has applied to reception of a first PDSCH transmission or transmission of a first PUSCH transmission scheduled by the second DCI is applied to reception of all PDSCH transmissions or transmission of all PUSCH transmissions in continuous slot scheduled by the second DCI. The capability may be received (e.g. gNB) from UE. Alternatively, the capability may be determined implicitly.

Figure 7:
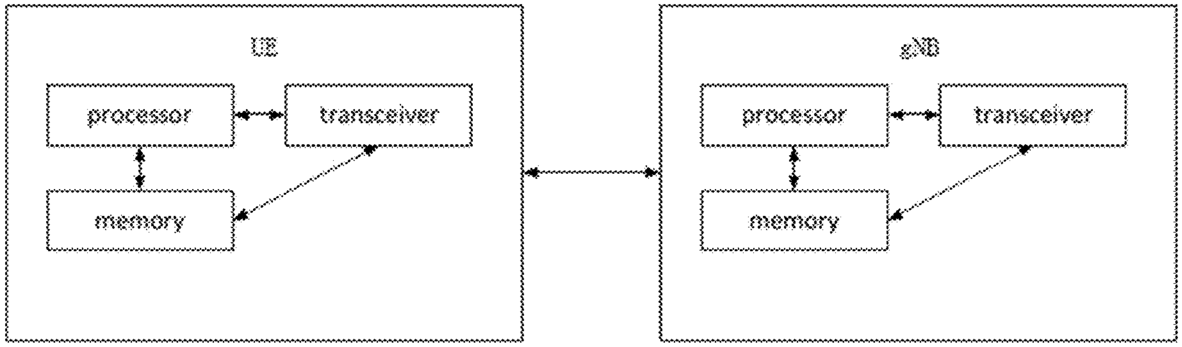
FIG. 7 is a schematic block diagram illustrating apparatuses according to one embodiment.

FIG. 7 is a schematic block diagram illustrating apparatuses according to one embodiment.

Referring to FIG. 7, the UE (i.e. the remote unit) includes a processor, a memory, and a transceiver. The processor implements a function, a process, and/or a method which are proposed in FIG. 5.

The UE comprises a receiver that receives a first DCI, wherein the first DCI schedules multiple PDSCH transmissions each of which carries one or multiple TBs, each TB carried in each PDSCH transmission is different, and the first DCI indicates a TCI or UL TCI state update; and a processor that determines application time of the TCI or UL TCI state update indicated by the first DCI based on at least one PUCCH resource carrying HARQ-ACK information for at least one of the TBs carried in all PDSCH transmissions scheduled by the first DCI.

In one embodiment, one ACK for any TB indicates an ACK for the first DCI. On the other hand. NACKs for all TBs of all PDSCH transmissions scheduled by the first DCI indicate a NACK for the first DCI. The application time of the TCI or UL TCI state update indicated by the first DCI may be determined based on a PUCCH resource carrying HARQ-ACK information including HARQ-ACK information for the last PDSCH transmission scheduled by the first DCI and an ACK for any TB of the scheduled PDSCH transmissions. Alternatively, the application time of the TCI or UL TCI state update indicated by the first DCI may be determined based on a first PUCCH resource carrying an ACK for any TB of any PDSCH transmission scheduled by the first DCI.

The receiver may further receive a second DCI that schedules multiple PDSCH transmissions or PUSCH transmissions in continuous slots each of which carries one or multiple TBs, each TB for each PDSCH transmission or PUSCH transmission scheduled by the second DCI is different; and the processor may further determines when the TCI or UL TCI state update indicated by the first DCI is applied according to a capability that indicates whether DL or UL beam switching within a CP for the SCS of the cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and the same as or earlier than a last slot for reception of PDSCH transmissions or transmission of PUSCH transmissions scheduled by the second DCI.

If the capability indicates that DL or UL beam switching within a CP for the SCS of the cell for reception of the PDSCH transmissions or transmission of PUSCH transmissions in continuous slots scheduled by the second DCI is supported, the TCI or UL TCI state update indicated by the first DCI is applied to each of reception of the PDSCH transmission(s) or transmission of PUSCH transmission(s) scheduled by the second DCI that is later than the first slot that is after the application time of the TCI or UL TCI state update indicated by the first DCI. If the capability indicates that DL or UL beam switching within a CP for the SCS of the cell for the PDSCH transmissions or PUSCH transmissions in continuous slots scheduled by the second DCI is not supported, the TCI or UL TCI state update indicated by the first DCI is not applied to any PDSCH transmission or PUSCH transmission scheduled by the second DCI, and the TCI or UL TCI state that has applied to reception of a first PDSCH transmission or transmission of a first PUSCH transmission scheduled by the second DCI is applied to reception of all PDSCH transmissions or transmission of all PUSCH transmissions in continuous slot scheduled by the second DCI. The capability may be transmitted to a base unit (e.g. gNB). Alternatively, the capability may be determined implicitly.

Referring to FIG. 7, the gNB (i.e. base unit) includes a processor, a memory, and a transceiver. The processors implement a function, a process, and/or a method which are proposed in FIG. 6.

The base unit comprises a transmitter that transmits a first DCI, wherein the first DCI schedules multiple PDSCH transmissions each of which carries one or multiple TBs, each TB carried in each PDSCH transmission is different, and the first DCI indicates a TCI or UL TCI state update; and a processor that determines application time of the TCI or UL TCI state update indicated by the first DCI based on at least one PUCCH resource carrying HARQ-ACK information for at least one of the TBs carried in all PDSCH transmissions scheduled by the first DCI.

In one embodiment, one ACK for any TB indicates an ACK for the first DCI. On the other hand, NACKs for all TBs of all PDSCH transmissions scheduled by the first DCI indicate a NACK for the first DCI. The application time of the TCI or UL TCI state update indicated by the first DCI may be determined based on a PUCCH resource carrying HARQ-ACK information including HARQ-ACK information for the last PDSCH transmission scheduled by the first DCI and an ACK for any TB of the scheduled PDSCH transmissions. Alternatively, the application time of the TCI or UL TCI state update indicated by the first DCI may be determined based on a first PUCCH resource carrying an ACK for any TB of any PDSCH transmission scheduled by the first DCI.

The transmitter may further transmit a second DCI that schedules multiple PDSCH transmissions or PUSCH transmissions in continuous slots each of which carries one or multiple TBs, each TB for each PDSCH transmission or PUSCH transmission scheduled by the second DCI is different; and the processor may further determines when the TCI or UL TCI state update indicated by the first DCI is applied according to a capability that indicates whether DL or UL beam switching within a CP for the SCS of the cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and the same as or earlier than a last slot for reception of PDSCH transmissions or transmission of PUSCH transmissions scheduled by the second DCI.

If the capability indicates that DL or UL beam switching within a CP for the SCS of the cell for reception of the PDSCH transmissions or transmission of PUSCH transmissions in continuous slots scheduled by the second DCI is supported, the TCI or UL TCI state update indicated by the first DCI is applied to each of reception of the PDSCH transmission(s) or transmission of PUSCH transmission(s) scheduled by the second DCI that is later than the first slot that is after the application time of the TCI or UL TCI state update indicated by the first DCI. If the capability indicates that DL or UL beam switching within a CP for the SCS of the cell for the PDSCH transmissions or PUSCH transmissions in continuous slots scheduled by the second DCI is not supported, the TCI or UL TCI state update indicated by the first DCI is not applied to any PDSCH transmission or PUSCH transmission scheduled by the second DCI, and the TCI or UL TCI state that has applied to reception of a first PDSCH transmission or transmission of a first PUSCH transmission scheduled by the second DCI is applied to reception of all PDSCH transmissions or transmission of all PUSCH transmissions in continuous slot scheduled by the second DCI. The capability may be received from UE. Alternatively, the capability may be determined implicitly.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment (UE), the method comprising:

receiving a first Downlink control information (DCI) that schedules multiple Physical Downlink Shared Channel (PDSCH) transmissions each of which carries one or multiple transport blocks (TBs), and the first DCI indicating a transmission configuration indication (TCI) or Uplink (UL) TCI state update;

determining application time of the TCI or UL TCI state update indicated by the first DCI based on at least one Physical Uplink Control Channel (PUCCH) resource carrying Hybrid Automatic Repeat Request (HARQ)-Acknowledge (ACK) information for at least one of the TBs carried in all PDSCH transmissions scheduled by the first DCI;

receiving a second DCI that is different from the first DCI that schedules multiple PDSCH transmissions or PUSCH transmissions in continuous slots each of which carries one or multiple TBs; and determining when the TCI or UL TCI state update indicated by the first DCI is applied according to a capability that indicates whether Downlink (DL) or UL beam switching within a cyclic prefix (CP) for a subcarrier spacing (SCS) of a cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and same as or earlier than a last slot for reception of PDSCH transmissions or transmission of PUSCH transmissions scheduled by the second DCI.

2. The method of claim 1, wherein, one ACK for any TB indicates an ACK for the first DCI.

3. The method of claim 1, wherein, Negative Acknowledge (NACK) s for all TBs of all PDSCH transmissions scheduled by the first DCI indicate a NACK for the first DCI.

4. A User Equipment (UE) for wireless communication, comprising:

at least one memory; and at least one processor coupled with the at least one memory and configured to cause the UE to:

receive a first Downlink control information (DCI) that schedules multiple Physical Downlink Shared Channel (PDSCH) transmissions each of which carries one or multiple transport blocks (TBs), and the first DCI indicating a transmission configuration indication (TCI) or Uplink (UL) TCI state update;

determine application time of the TCI or UL TCI state update indicated by the first DCI based on at least one Physical Uplink Control Channel (PUCCH) resource carrying Hybrid Automatic Repeat Request (HARQ)-Acknowledge (ACK) information for at least one of the TBs carried in all PDSCH transmissions scheduled by the first DCI;

receive a second DCI that is different from the first DCI that schedules multiple PDSCH transmissions or PUSCH transmissions in continuous slots each of which carries one or multiple TBs; and determine when the TCI or UL TCI state update indicated by the first DCI is applied according to a capability that indicates whether Downlink (DL) or UL beam switching within a cyclic prefix (CP) for a subcarrier spacing (SCS) of a cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and same as or earlier than a last slot for reception of PDSCH transmissions or transmission of PUSCH transmissions scheduled by the second DCI.

5. A base unit for wireless communication, comprising:

at least one memory; and at least one processor coupled with the at least one memory and configured to cause the base unit to:

transmit a first Downlink control information (DCI) that schedules multiple Physical Downlink Shared Channel (PDSCH) transmissions each of which carries one or multiple transport blocks (TBs), and the first DCI indicating a transmission configuration indication (TCI) or Uplink (UL) TCI state update;

determine application time of the TCI or UL TCI state update indicated by the first DCI based on at least one Physical Uplink Control Channel (PUCCH) resource carrying Hybrid Automatic Repeat Request (HARQ)-Acknowledge (ACK) information for at least one of the TBs carried in all PDSCH transmissions scheduled by the first DCI;

transmit a second DCI that is different from the first DCI that schedules multiple PDSCH transmissions or PUSCH transmissions in continuous slots each of which carries one or multiple TBs; and determine when the TCI or UL TCI state update indicated by the first DCI is applied according to a capability that indicates whether Downlink (DL) or UL beam switching within a cyclic prefix (CP) for a subcarrier spacing (SCS) of a cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and same as or earlier than a last slot for reception of PDSCH transmissions or transmission of PUSCH transmissions scheduled by the second DCI.

6. The UE of claim 4, wherein, one ACK for any TB indicates an ACK for the first DCI.

7. The UE of claim 4, wherein, Negative Acknowledge (NACK) s for all TBs of all PDSCH transmissions scheduled by the first DCI indicate a NACK for the first DCI.

8. The UE of claim 4, wherein, the at least one processor is configured to cause the UE to determine the application time of the TCI or UL TCI state update indicated by the first DCI based on a PUCCH resource carrying HARQ-ACK information including HARQ-ACK information for a last PDSCH transmission scheduled by the first DCI and an ACK for any TB of the scheduled PDSCH transmissions.

9. The UE of claim 4, wherein, the at least one processor is configured to cause the UE to determine the application time of the TCI or UL TCI state update indicated by the first DCI based on a first PUCCH resource carrying an ACK for any TB of any PDSCH transmission scheduled by the first DCI.

10. The UE of claim 4, wherein each TB for each PDSCH transmission or PUSCH transmission scheduled by the second DCI is different.

11. The UE of claim 10, wherein, if the capability indicates that DL or UL beam switching within a CP for the SCS of the cell for reception of the PDSCH transmissions or transmission of PUSCH transmissions in continuous slots scheduled by the second DCI is supported, applying the TCI or UL TCI state update indicated by the first DCI to each of reception of one or more PDSCH transmissions or transmission of one or more PUSCH transmissions scheduled by the second DCI that is later than the first slot that is after the application time of the TCI or UL TCI state update indicated by the first DCI.

12. The UE of claim 10, wherein, if the capability indicates that DL or UL beam switching within a CP for the SCS of the cell for the PDSCH transmissions or PUSCH transmissions in continuous slots scheduled by the second DCI is not supported, the TCI or UL TCI state update indicated by the first DCI is not applied to any PDSCH transmission or PUSCH transmission scheduled by the second DCI, and the TCI or UL TCI state that has applied to reception of a first PDSCH transmission or transmission of a first PUSCH transmission scheduled by the second DCI is applied to reception of all PDSCH transmissions or transmission of all PUSCH transmissions in continuous slot scheduled by the second DCI.

13. The UE of claim 10 wherein, the at least one processor is configured to cause the UE to transmit the capability.

14. The UE of claim 10, wherein, the at least one processor is configured to cause the UE to determine the capability implicitly.

15. A processor for wireless communication, comprising:

at least one controller coupled with at least one memory and configured to cause the processor to:

transmit a first Downlink control information (DCI) that schedules multiple Physical Downlink Shared Channel (PDSCH) transmissions each of which carries one or multiple transport blocks (TBs), and the first DCI indicating a transmission configuration indication (TCI) or Uplink (UL) TCI state update;

determine application time of the TCI or UL TCI state update indicated by the first DCI based on at least one Physical Uplink Control Channel (PUCCH) resource carrying Hybrid Automatic Repeat Request (HARQ)-Acknowledge (ACK) information for at least one of the TBs carried in all PDSCH transmissions scheduled by the first DCI;

transmit a second DCI that is different from the first DCI that schedules multiple PDSCH transmissions or PUSCH transmissions in continuous slots each of which carries one or multiple TBs; and determine when the TCI or UL TCI state update indicated by the first DCI is applied according to a capability that indicates whether Downlink (DL) or UL beam switching within a cyclic prefix (CP) for a subcarrier spacing (SCS) of a cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and same as or earlier than a last slot for reception of PDSCH transmissions or transmission of PUSCH transmissions scheduled by the second DCI.

16. The processor of claim 15, wherein, one ACK for any TB indicates an ACK for the first DCI.

17. The processor of claim 15, wherein, Negative Acknowledge (NACK) s for all TBs of all PDSCH transmissions scheduled by the first DCI indicate a NACK for the first DCI.

18. The processor of claim 15, wherein, the at least one controller is configured to cause the processor to determine the application time of the TCI or UL TCI state update indicated by the first DCI based on a PUCCH resource carrying HARQ-ACK information including HARQ-ACK information for a last PDSCH transmission scheduled by the first DCI and an ACK for any TB of the scheduled PDSCH transmissions.

19. The processor of claim 15, wherein, the at least one controller is configured to cause the processor to determine the application time of the TCI or UL TCI state update indicated by the first DCI based on a first PUCCH resource carrying an ACK for any TB of any PDSCH transmission scheduled by the first DCI.

20. The processor of claim 15, wherein, the at least one controller is configured to cause the processor to:

receive a second DCI that schedules multiple PDSCH transmissions or PUSCH transmissions in continuous slots each of which carries one or multiple TBs, wherein each TB for each PDSCH transmission or PUSCH transmission scheduled by the second DCI is different; and determine when the TCI or UL TCI state update indicated by the first DCI is applied according to a capability that indicates whether Downlink (DL) or UL beam switching within a cyclic prefix (CP) for a subcarrier spacing (SCS) of a cell for reception of PDSCH transmissions or transmission of PUSCH transmissions in continuous slots scheduled by the second DCI is supported, if a first slot that is after the application time of the TCI or UL TCI state update indicated by the first DCI is later than a first slot for reception of PDSCH transmissions or transmission of PUSCH transmissions scheduled by the second DCI and same as or earlier than a last slot for reception of PDSCH transmissions or transmission of PUSCH transmissions scheduled by the second DCI.

* * * * *